(12) United States Patent
Katayanagi et al.

(10) Patent No.: US 12,086,658 B2
(45) Date of Patent: Sep. 10, 2024

(54) SERVICE COOPERATION SUPPORT APPARATUS, SERVICE COOPERATION SUPPORT METHOD AND SERVICE COOPERATION SUPPORT PROGRAM

(71) Applicant: Nippon Telegraph and Telephone Corporation, Tokyo (JP)

(72) Inventors: Ryota Katayanagi, Musashino (JP); Satoshi Kondo, Musashino (JP); Kensuke Takahashi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 240 days.

(21) Appl. No.: 17/764,750

(22) PCT Filed: Oct. 11, 2019

(86) PCT No.: PCT/JP2019/040251
§ 371 (c)(1),
(2) Date: Mar. 29, 2022

(87) PCT Pub. No.: WO2021/070364
PCT Pub. Date: Apr. 15, 2021

(65) Prior Publication Data
US 2022/0374291 A1 Nov. 24, 2022

(51) Int. Cl.
*G06F 9/54* (2006.01)
(52) U.S. Cl.
CPC ............ *G06F 9/541* (2013.01); *G06F 9/542* (2013.01)
(58) Field of Classification Search
CPC .......... G06F 9/541; G06F 9/542; G06F 9/445; G06F 13/00
See application file for complete search history.

(56) References Cited

U.S. PATENT DOCUMENTS

| 7,702,770 B1* | 4/2010 | Potluri | G06F 9/547 709/224 |
| 2007/0282979 A1* | 12/2007 | Tuel | H04L 67/1027 709/219 |
| 2011/0040826 A1* | 2/2011 | Chadzelek | H04L 67/142 709/203 |
| 2011/0131642 A1* | 6/2011 | Hamura | G06F 9/54 709/227 |

(Continued)

FOREIGN PATENT DOCUMENTS

JP 2018206050 12/2018

OTHER PUBLICATIONS

Barta, "Interface-parasite Gateways", pp. 1-15. (Year: 1995).*

(Continued)

*Primary Examiner* — Kevin L Young
*Assistant Examiner* — Phuong N Hoang
(74) *Attorney, Agent, or Firm* — Fish & Richardson P.C.

(57) ABSTRACT

A service linkage assistance device includes an executing unit which accepts a request for a stateless API for a stateful service which exposes a stateful API from a service linkage device which executes a linkage service obtained by linking multiple services including the stateful service, interprets the request, and executes the stateful API and a storage unit which stores dynamic information included in a response from the stateful API, and the stateless API is exposed to the service linkage device by the service linkage assistance device.

9 Claims, 5 Drawing Sheets

(56) References Cited

U.S. PATENT DOCUMENTS

| 2012/0166525 A1* | 6/2012 | Dittrich | G06Q 10/0633 |
| --- | --- | --- | --- |
| | | | 709/203 |
| 2012/0278820 A1* | 11/2012 | Dayka | G06F 21/53 |
| | | | 719/328 |
| 2013/0167162 A1* | 6/2013 | Fernandez | A63F 13/828 |
| | | | 719/328 |
| 2017/0310763 A1* | 10/2017 | Morgan | H04L 67/1027 |

OTHER PUBLICATIONS

Take et al., "Applicability of Swagger Codegen to API adapter development," Lecture at the IEICE General Conference, Mar. 20, 2018, 3 pages (with English Translation).

Take et al., "Method to Simplify API Adapter Development using GUI," IEICE 2018 Society Tournament, Sep. 11, 2018, 3 page (with English Translation).

Take et al., "Study on Supporting Web API Adaptor Development," Institute of Electronics, Information and Communication Engineers, Oct. 19, 2017, 3 pages (with English Translation).

Take et al., "Usage of service enablers for IMS (IP Multimedia Subsystem) Application and related standard specifications," IEICE Technical Report, 2010, 110(69):41-46, 17 pages (with English Translation).

\* cited by examiner

SERVICE COOPERATION SUPPORT APPARATUS, SERVICE COOPERATION SUPPORT METHOD AND SERVICE COOPERATION SUPPORT PROGRAM

CROSS-REFERENCE TO RELATED APPLICATIONS

This application is a National Stage application under 35 U.S.C. § 371 of International Application No. PCT/JP2019/040251, having an International Filing Date of Oct. 11, 2019. The disclosure of the prior application is considered part of the disclosure of this application, and is incorporated in its entirety into this application.

TECHNICAL FIELD

The present invention relates to a service linkage assistance device, a service linkage assistance method, and a service linkage assistance program.

BACKGROUND ART

As communication services have become more diverse, linkage services in which multiple kinds of services are linked have become more important, and there is a demand for quicker and less costly approaches regarding introduction of new services related to linkage services or changes in the specifications of existing services.

In order to cope with such changes, there is a technique for loosely coupling a catalog management unit which defines service specifications and API specifications with an adapter which executes APIs according to these specifications, so that the cost for addressing new services or changes in the specifications of existing services can be reduced (PTL 1).

For the purpose of facilitating development of such adapters, there are also techniques for generating an adapter with minimum implementation using a common library and Swagger Codegen, and generating an adapter using a GUI (NPL 1 to NPL 3).

CITATION LIST

Patent Literature

[PTL 1] Japanese Patent Application Publication No. 2018-206050

Non Patent Literature

[NPL 1] Naoki Take and 5 others, "A Study on Facilitation of Web API Adapter Development", 14th Steering Committee on Network Software (NWS) Meeting, IEICE, Oct. 19, 2017

[NPL 2] Naoki Take and 5 others, "Applicability of Swagger Codegen in API Adapter Development", Proceedings of the IEICE General Conference, B-14-13, IEICE, Mar. 20-23, 2018

[NPL 3] Naoki Take and 5 others, "A Study on Method for Facilitating API Adapter Development Using GUI", Proceedings of the IEICE Society Conference, B-14-13, IEICE, Sep. 11-14, 2018

SUMMARY OF THE INVENTION

Technical Problem

However, the techniques for facilitating development of adapters in NPL 1 to NPL 3 are applicable only to the service which exposes a stateless API where each request from the client must contain all the information necessary for API processing. In other words, the adapters created by the above-described development facilitation techniques cannot support services that expose stateful APIs where the server uses session information with the client. Therefore, it is not easy to develop an adapter which supports stateful APIs, and it is costly and time-consuming to develop such an adapter.

With the foregoing in view, it is an object of the present invention to facilitate development of an adapter provided in a service linkage device even for a service which exposes a stateful API and to facilitate linkage between the service which exposes the stateful API and other services.

Means for Solving the Problem

In order to achieve the object, a service linkage assistance device according to an embodiment of the present invention includes an executing unit which accepts a request for a stateless API for a stateful service which exposes a stateful API from a service linkage device which executes a linkage service obtained by linking multiple services including the stateful service, interprets the request, and executes the stateful API and a storage unit which stores dynamic information included in a response from the stateful API, and the stateless API is exposed to the service linkage device by the service linkage assistance device.

A service linkage assistance method carried out by a service linkage assistance device according to an embodiment of the present invention includes accepting a request for a stateless API for a stateful service which exposes a stateful API from a service linkage device which executes a linkage service obtained by linking multiple services including the stateful service, executing the stateful API by interpreting the request, and storing dynamic information included in a response from the stateful API in a storage unit, and the stateless API is exposed to the service linkage device by the service linkage assistance device.

A service linkage assistance program according to an embodiment of the present invention causes a computer to function as the service linkage assistance device.

Effects of the Invention

According to the embodiment, development of an adapter provided in a service linkage device can be facilitated even for a service which exposes a stateful API, so that the service which exposes the stateful API can be easily linked with other services.

DESCRIPTION OF EMBODIMENTS

Hereinafter, an embodiment of the present invention will be described in conjunction with the accompanying drawings.

(Configuration of Service Linkage System)

Figure 1:
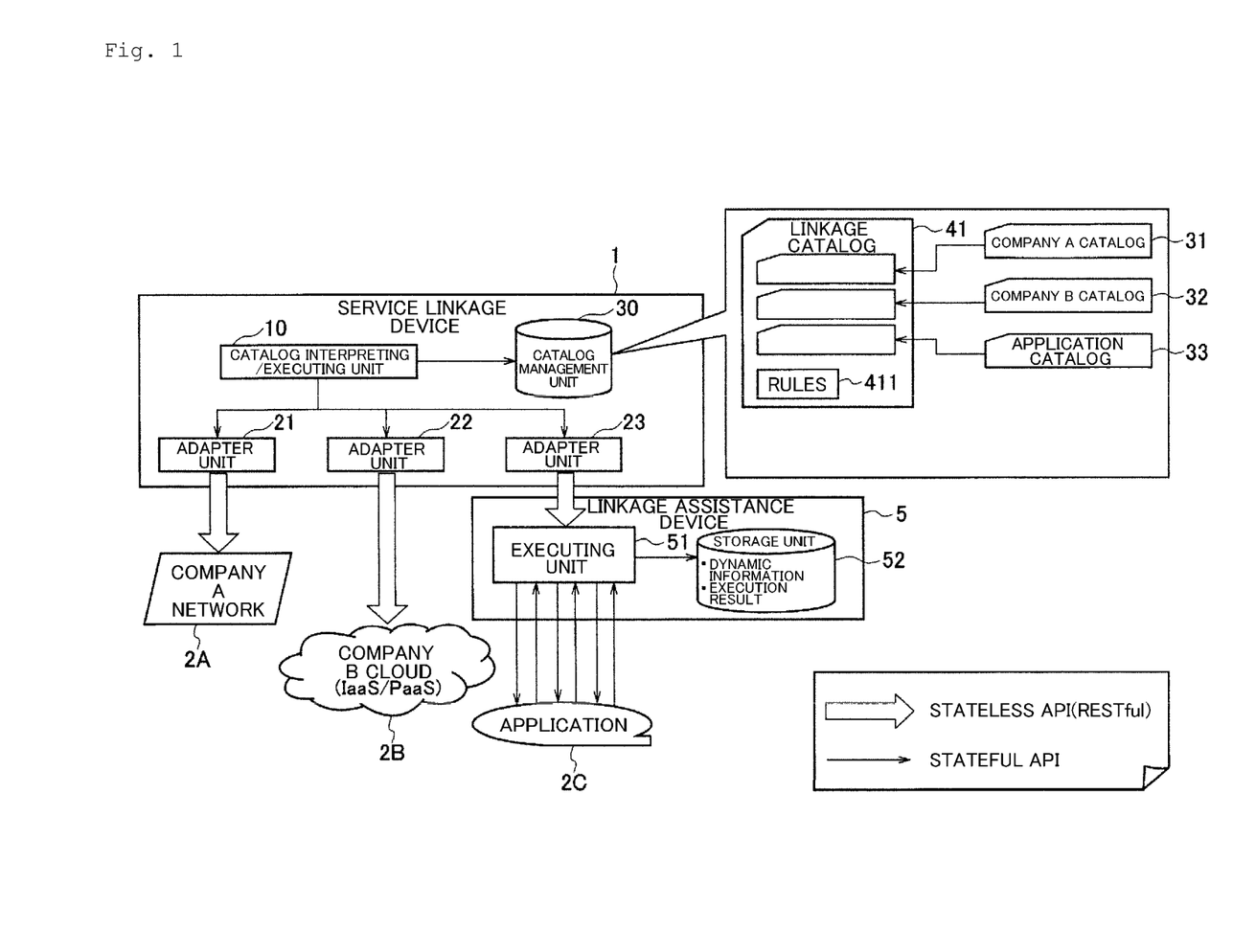
FIG. 1 is a diagram of an exemplary configuration of a service linkage system according to an embodiment of the present invention.

FIG. 1 shows a configuration of the service linkage system according to the embodiment. The shown service linkage system includes a service linkage device 1, a plurality of services 2A, 2B, and 2C, and a linkage assistance device 5 (a service linkage assistance device).

The service linkage device 1 executes a linkage service obtained by linking multiple kinds of services. FIG. 1 shows the three services 2A, 2B, and 2C as the multiple kinds of services. The service 2A is a network service provided by Company A (a service provider). The service 2B is a cloud service such as IaaS (Infrastructure as a Service) and PaaS (Platform as a Service) provided by Company B (service provider). The service 2C is a service for a web application (hereinafter referred to as "application") provided by Company C (a service provider). The number and kinds of services handled according to the present invention are not limited to the above.

Here, the services 2A and 2B have and expose (provide) stateless APIs (hereinafter also referred to as "stateless services"). On the other hand, the service 2C has and exposes a stateful API (also referred to as a "stateful service").

In a stateless (RESTful) communication method, the server does not maintain dynamic information such as session information with clients. Therefore, the stateless communication method is a self-contained method where a request from the client contains all the information necessary for API execution (processing). In a stateful communication method, the server maintains dynamic information such as session information with the client and refers to the information as appropriate during API execution (processing).

According to the embodiment, it is assumed that the service 2C which exposes a stateful API and the services 2A and 2B which expose stateless APIs are linked to form a single linkage service. In other words, according to the embodiment, the service linkage device 1 executes a linkage service obtained by linking multiple services including the service 2C which exposes a stateful API.

(Configuration of Service Linkage Device)

The service linkage device 1 according to the embodiment realizes the linkage service obtained by linking multiple services regardless of the communication method (stateless or stateless) of the APIs of the services to be linked. Here, the service linkage device 1 executes a linkage service obtained by linking multiple services including the application service 2C which exposes a stateful API. The shown service linkage device 1 includes a catalog interpreting/executing unit 10, adapter units 21 to 23, and a catalog management unit 30.

The catalog management unit 30 manages a catalog (a product catalog) which defines the specifications of a service. The catalog is stored for example in the storage unit (not shown) of the catalog management unit 30. FIG. 1 shows a Company A catalog 31, a Company B catalog 32, and an application catalog 33 for each of the plurality of services 2A, 2B, and 2C. The catalogs handled according to the present invention are not limited to the above. A catalog is prepared for each service, and when a new service is added, a catalog corresponding to the service is prepared, and the catalog management unit 30 registers and manages the catalog in the storage unit.

Multiple catalogs for multiple services which constitute a linkage service are combined, so that the catalog management unit 30 produces a linkage catalog, which is a catalog for the linkage service, and stores the catalog in the storage unit. In FIG. 1, the catalog management unit 30 produces and stores, in the storage unit, a linkage catalog 41 that combines the Company A catalog 31, the Company B catalog 32, and the application catalog 33. The linkage catalog 41 defines the specifications of the linkage service including the three services 2A, 2B, and 2C. In addition, the linkage catalog 41 includes rules 411. The rules 411 include regulations regarding the linkage operation between services which constitute the linkage service.

When a request for a linkage service is received from a client (not shown) as a customer of a service provider, the catalog interpreting/executing unit 10 processes the request by interpreting the contents of the catalogs in the linkage catalog of the linkage service. The catalog interpreting/executing unit 10 interprets all the catalogs included in the linkage catalog and processes the request. The catalog interpreting/executing unit 10 can be considered as a functional unit which executes common processing among services which is independent of each of services corresponding to the catalogs.

The adapter units 21 to 23 execute the APIs of the services which constitute the linkage service and process a request from the client. The adapter units 21 to 23 are provided for each service, and when a new service is added, the service linkage device 1 adds a new adapter unit. The adapter units 21 to 23 can be each considered as a functional unit which processes a request dependent on the API specifications of each service.

In the service linkage device 1 according to the embodiment, when a new service is to be linked to a linkage service, it is only necessary to prepare a catalog and an adapter unit corresponding to the new service. Therefore, additional development for the service linkage device 1 as a whole is not necessary, and the follow-up cost in adding a new service and a new API to the linkage service can be reduced.

In the service linkage device 1 according to the embodiment, a group of services which constitute a linkage service can be configured as a catalog-driven loosely coupled architecture by using the catalog.

(Configuration of Linkage Assistance Device)

The linkage assistance device 5 facilitates linkage between stateful services which expose stateful APIs and other services. Specifically, the device assists the service linkage device 1 to realize a linkage service which includes a service which exposes a stateful API as well as a service which exposes a stateless API in a shorter period of time at a lower cost. In other words, the linkage assistance device 5 accepts a request for a stateless API, interprets the request, and executes the stateful API.

The shown linkage assistance device 5 includes an executing unit 51 and a storage unit 52. The executing unit 51 accepts a request for a stateless API for a stateful service from the service linkage device 1 which executes a linkage service obtained by linking multiple services including a stateful service which exposes a stateful API, interprets the request, and executes the stateful API. The stateless API is a stateless API exposed to the service linkage device 1 by the linkage assistance device 5.

The executing unit 51 notifies the service linkage device 1 of the completion of execution of the stateful API and prompts the service linkage device 1 to obtain the execution result of the stateful API. The executing unit 51 includes dynamic information stored in the storage unit 52 in the second or subsequent request to the stateful API.

The dynamic information included in the response of the stateful API is stored in the storage unit 52. The dynamic information is information necessary for executing the stateful API and is notified by the server on the service side (the server of the application service 2C in this example) at the time of execution of the stateful API. The dynamic information may include session information (such as cookies) between the service linkage assistance device and the server which provides the stateful service. The storage unit 52 may also include the result of execution of the stateful API.

Figure 2:
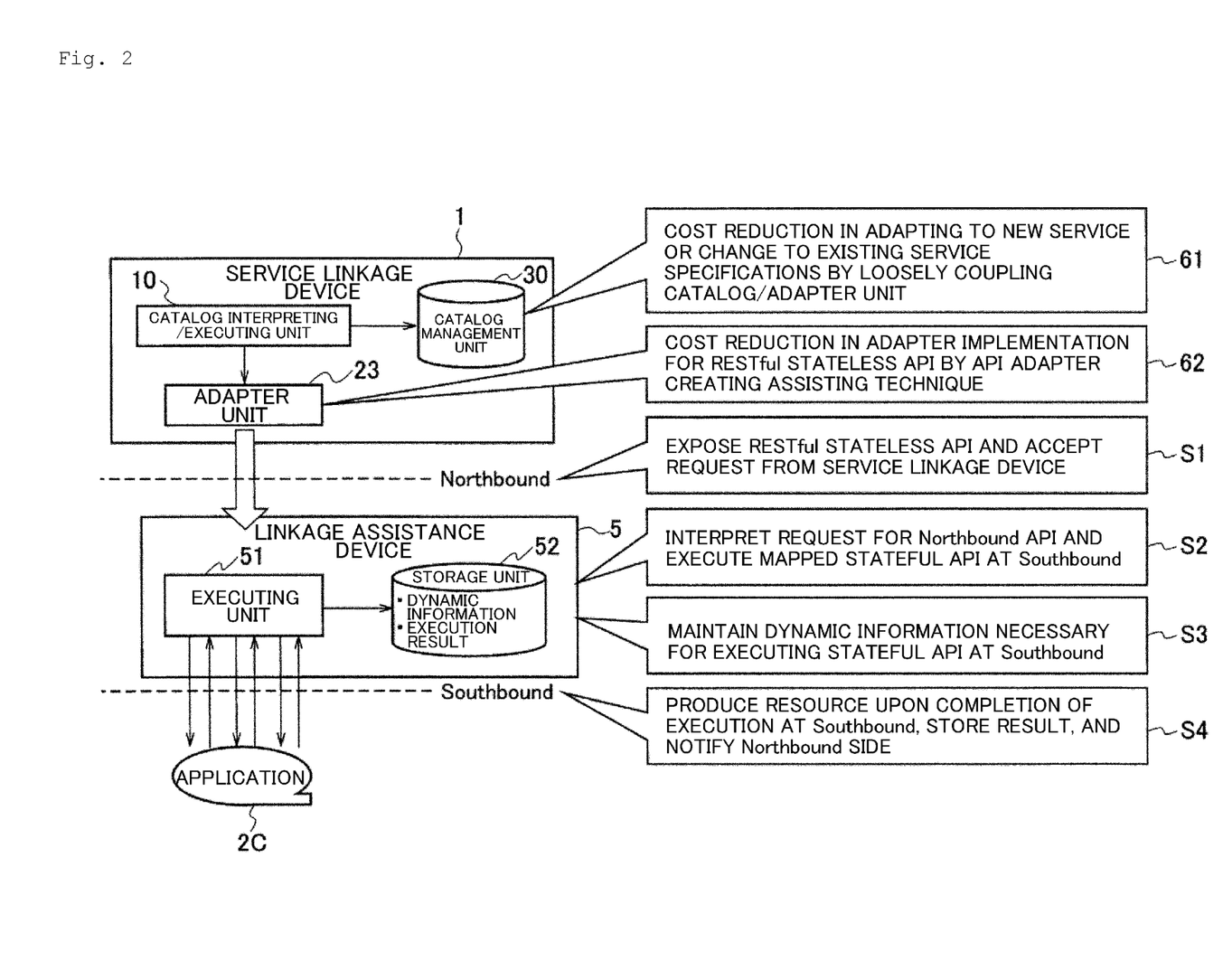
FIG. 2 illustrates an overall configuration of a linkage assistance device.

FIG. 2 illustrates an overall configuration of the linkage assistance device 5. Here, the processing between the linkage assistance device 5 and the service linkage device 1 will be described, while the configuration regarding the services 2A and 2B which expose stateless APIs will not be described.

The linkage assistance device 5 assists linkage between the service 2C, which exposes a stateful API and other services without losing merits of the service linkage device 1. A first merit 61 is that addition of a new service or adaptation to change in the specifications of an existing service can be less costly by loosely coupling the catalog management unit 30 with the adapter unit 23. A second merit 62 is that even for the service 2C which exposes a stateful API, the service linkage device 1 can implement the adapter unit 23 for a RESTful stateless API to which any of the development facilitation techniques (NPL 1 to NPL 3) is applied, so that the development cost for the adapter unit 23 can be reduced.

To this end, the linkage assistance device 5 exposes a Northbound stateless API and accepts a request from the service linkage device 1 (S1). The Northbound API is an API exposed to a higher-level device (the service linkage device 1 in this example) which manages and operates the linkage assistance device 5 from the side of the device 5.

The linkage assistance device 5 implements a Northbound API for each stateful service and exposes the API to the service linkage device 1. In order to allow the service linkage device 1 to operate a stateful service indirectly through the linkage assistance device 5, the linkage assistance device 5 exposes a stateless API to the Northbound. The stateless API is previously generated according to the specifications of a stateful API and a catalog on the service side and is implemented in the executing unit 51 of the linkage assistance device 5.

The service linkage system may have a separate linkage assistance device 5 for each stateful service. Alternatively, the service linkage system may have one linkage assistance device 5 for multiple stateful services, and the linkage assistance device 5 may expose a stateless API for each service.

The linkage assistance device 5 interprets a request for a stateless API transmitted from the service linkage device 1, maps the request to each corresponding API of the Southbound stateful APIs, and executes the stateful API (S2). The Southbound API is an API exposed by a lower-level device (the application service 2C in this example) which is as an operation target from the side of the linkage assistance device 5.

The linkage assistance device 5 maintains dynamic information (such as session information) necessary for executing the stateful API (S3). The linkage assistance device 5 stores the execution result of the stateful API in the storage unit 52 and notifies the service linkage device 1 on the Northbound side (S4). Specifically, the linkage assistance device 5 secures resources and temporarily stores the execution result in the storage unit 52 of the linkage assistance device 5 so that the service linkage device 1 can obtain the execution result transmitted from the application service 2C. Then, after the execution of the Southbound stateful API is completed, the linkage assistance device 5 notifies the service linkage device 1 that the execution result of the stateful API is maintained.

(Preconditions for Service Linkage System)

Figure 3:
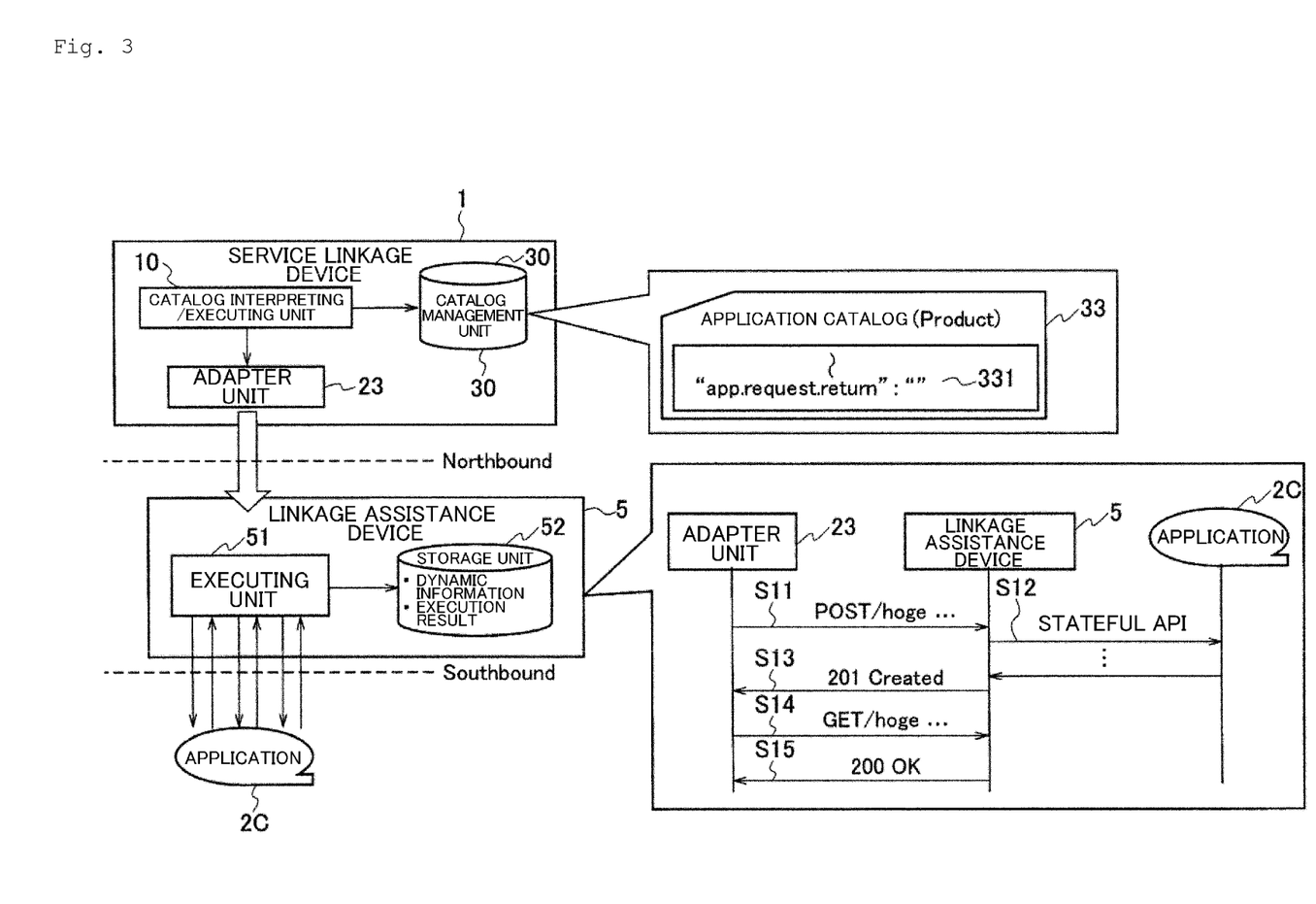
FIG. 3 illustrates preconditions for the service linkage system.

FIG. 3 illustrates preconditions for the service linkage system to implement the linkage assistance device 5.

Since the execution result of the Southbound stateful API by the linkage assistance device 5 is maintained in the linkage assistance device 5, the adapter unit 23 of the service linkage device 1 needs to send a request (GET method) to obtain the execution result in response to a response from the linkage assistance device 5. Therefore, the Northbound stateless API exposed by the linkage assistance device 5 includes an API for obtaining the execution result. Therefore, the adapter unit 23 according to the embodiment transmits, through the stateless API, a request to instruct execution of the stateful API and a request to obtain the execution result to the linkage assistance device 5.

As shown, the adapter unit 23 transmits, through the stateless API, a request (POST method) to instruct execution of the stateful API of the application service 2C to the linkage assistance device 5 (S11). The linkage assistance device 5 executes the stateful API of the application service 2C (S12).

After completion of execution of the stateful API, the linkage assistance device 5 notifies the service linkage device 1 that the execution result is maintained (S13). Specifically, the linkage assistance device 5 transmits, to the service linkage device 1, "201 Created" (normal response) indicating that the request has been successful, and creation of the resource has been completed.

Upon receiving the response in S23, the adapter unit 23 of the service linkage device 1 transmits a request (GET method) to the linkage assistance device 5 to obtain the execution result (S14). The linkage assistance device 5 transmits the execution result maintained in the storage unit 52 to the service linkage device 1 together with 200 OK (normal response) (S15). The adapter unit 23 stores the obtained execution result in the characteristic 331 of the catalog 33.

The catalog of the stateful services of the service linkage device 1 requires a characteristic (attribute) to store the execution results by the linkage assistance device 5. In the shown example, the service linkage device 1 (the catalog management unit 30) defines the characteristic 331 for storing the execution result in the application catalog 33. The application catalog 33 is the Product catalog of the stateful application service 2C.

(Operation of Service Linkage System)

Figure 4:
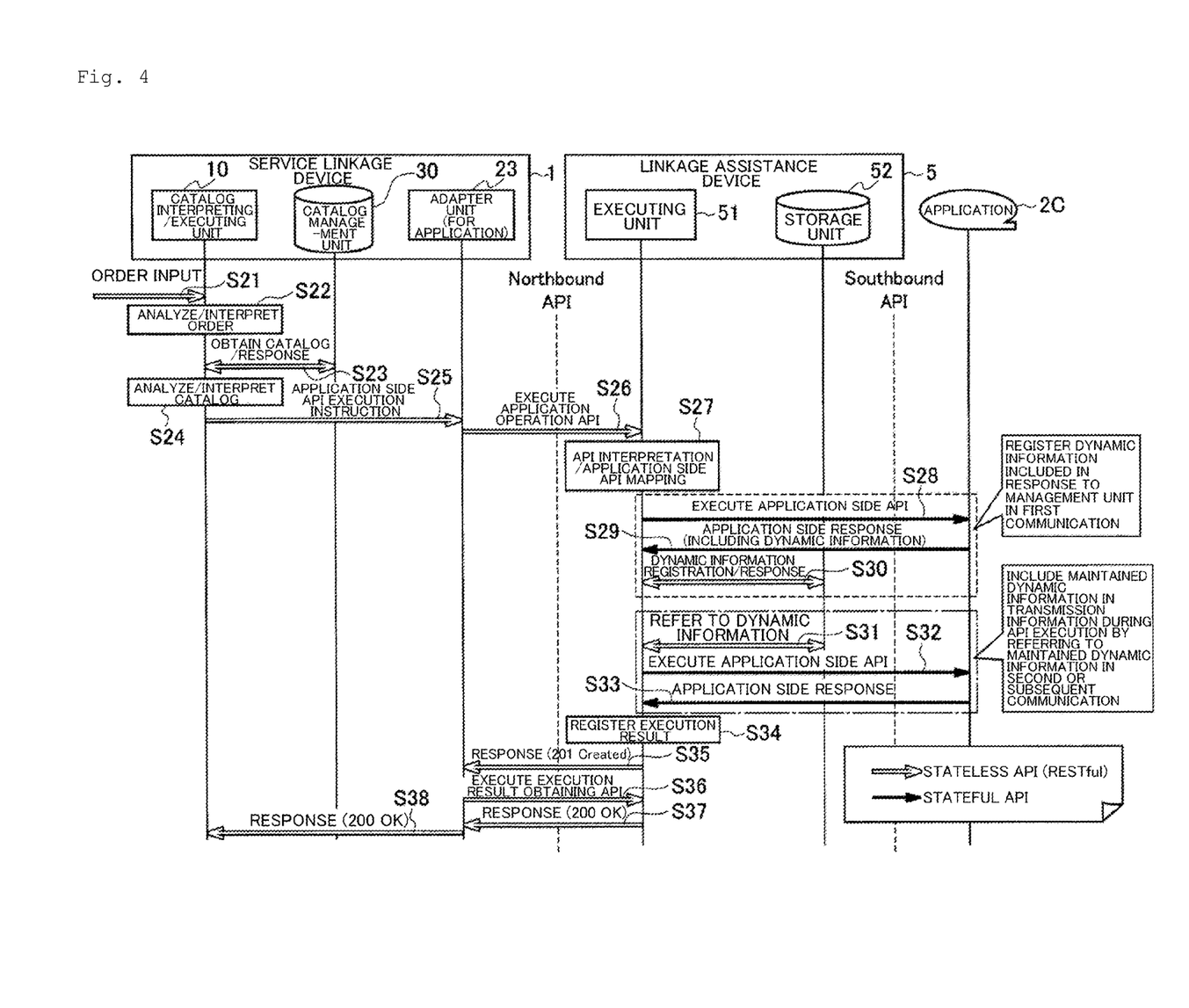
FIG. 4 is a sequence diagram for illustrating the operation of the service linkage system.

FIG. 4 is a sequence diagram showing the operation of the service linkage system according to the embodiment. The processing between the service linkage device 1 and the linkage assistance device 5 will be described with reference to FIG. 4, and therefore the configuration and processing related to the services 2A and 2B which expose stateless APIs are not included.

The catalog interpreting/executing unit 10 of the service linkage device 1 receives an order (a ProductOrder) for a linkage service from a client (S21), analyzes the order and interprets the order (S22). Then, the catalog interpreting/executing unit 10 requests the catalog management unit 30 for a linkage catalog specified in the order and obtains the linkage catalog (S23).

Then, the catalog interpreting/executing unit 10 analyzes and interprets the linkage catalog (S24) and instructs the adapter units for the plurality of services included in the linkage catalog to execute the APIs exposed by the services according to the rules in the linkage catalog (S25). In the shown example, the catalog interpreting/executing unit 10 instructs the adapter unit 23 for the application service 2C to execute the API (an application-side API) exposed by the application service 2C.

Upon accepting the instruction from the catalog interpreting/executing unit 10, the adapter unit 23 executes the stateless API (an application operation API) exposed by the linkage assistance device 5 for the application service 2C (S26). More specifically, the adapter unit 23 transmits a request (such as POST method) instructing execution of the stateful API of the application service 2C to the linkage assistance device 5 through the stateless API. The request for instructing execution of the stateful API in S26 is a request for operating the application service 2C.

The executing unit 51 of the linkage assistance device 5 receives the request from the service linkage device 1, interprets the request, and executes the stateful API (the application side API) of the application service 2C. Specifically, the executing unit 51 interprets the request and maps (edits) the request according to the specifications of the stateful API exposed by the application service 2C (S27). Then, the executing unit 51 executes the stateful API exposed by the application service 2C using the mapped request (S28).

The application service 2C transmits the execution result (response) for the request to the linkage assistance device 5 through the stateful API, and the executing unit 51 of the linkage assistance device 5 obtains the execution result (response) through the stateful API (S29). Note that when communicating with the linkage assistance device 5 for the first time, the application service 2C transmits dynamic information such as session information in addition to the execution result to the linkage assistance device 5.

Upon obtaining the dynamic information, the executing unit 51 registers the dynamic information in the storage unit 52 (S30). Specifically, the executing unit 51 requests the storage unit 52 to register the dynamic information and accepts a response about successful registration from the storage unit 52.

When transmitting a request for the second time and on, the executing unit 51 requests dynamic information stored in the storage unit 52 and obtains the dynamic information (S31). The executing unit 51 transmits the second or subsequent request with the dynamic information added to the request to the stateful API and executes the stateful API (S32). The executing unit 51 obtains the execution result (response) through the stateful API (S33).

After the completion of execution of the stateful API, the executing unit 51 stores the execution result in the storage unit 52 (S34). Specifically, the executing unit 51 requests the storage unit 52 to register the execution result and accepts a response about successful registration from the storage unit 52.

Then, the executing unit 51 notifies the service linkage device 1 that the execution result of the stateful API is maintained (S35). Specifically, the executing unit 51 transmits, to the service linkage device 1, "201 Created" (a normal response) indicating that the request has been successful, and the resource has been created.

Upon receiving the response in S35, the adapter unit 23 of the service linkage device 1 transmits a request (GET method) to obtain the execution result to the linkage assistance device 5 through an execution result obtaining API (S36).

The executing unit 51 of the linkage assistance device 5 transmits the execution result maintained in the storage unit 52 to the service linkage device 1 together with 200 OK (a normal response) (S37). The adapter unit 23 of the service linkage device 1 transmits the 200 OK including the execution result to the catalog interpreting/executing unit 10 (S38). The catalog interpreting/executing unit 10 stores the execution result in the characteristic 331 of the application catalog 33. Then, the catalog interpreting/executing unit 10 executes complementing processing to reflect the execution results for the orders obtained from the adapters to the services which constitute the linkage service according to the rules 411 in the linkage catalog 41.

Effects of Embodiments

The above-described service linkage assistance device according to the embodiment includes an executing unit which accepts a request for a stateless API for a stateful service which exposes a stateful API from a service linkage device which executes a linkage service obtained by linking multiple services including the stateful service, interprets the request, and executes the stateful API, and a storage unit which stores dynamic information included in a response from the stateful API, and the stateless API is exposed to the service linkage device by the service linkage assistance device.

In this way, according to the embodiment, the linkage assistance device 5 exposes a stateless API corresponding to a service which exposes a stateful API to the service linkage device 1, and the adapter unit of the service linkage device 1 executes the stateless API. As a result, according to the embodiment, even an adapter unit for a service which exposes a stateful API can be easily developed by applying the above-described development facilitation techniques (NPL 1 to NPL 3). In other words, according to the embodiment, an adapter unit for a service which exposes a stateful API can be developed in a shorter period of time at a lower cost.

Therefore, according to the embodiment, development of an adapter provided in a service linkage device can be facilitated even for a service which exposes a stateful API, so that the service which exposes the stateful API can be easily linked with other services. In other words, multiple services including a service with a stateful API can be linked in a shorter period of time at a lower cost.

Furthermore, according to the embodiment, the linkage assistance device 5 notifies the service linkage device 1 of the completion of execution of a stateful API and prompts the service linkage device 1 to obtain the execution result of the stateful API. In this way, according to the embodiment, the service linkage device 1 can obtain the execution result of the stateful API.

(Hardware Configuration)

Figure 5:
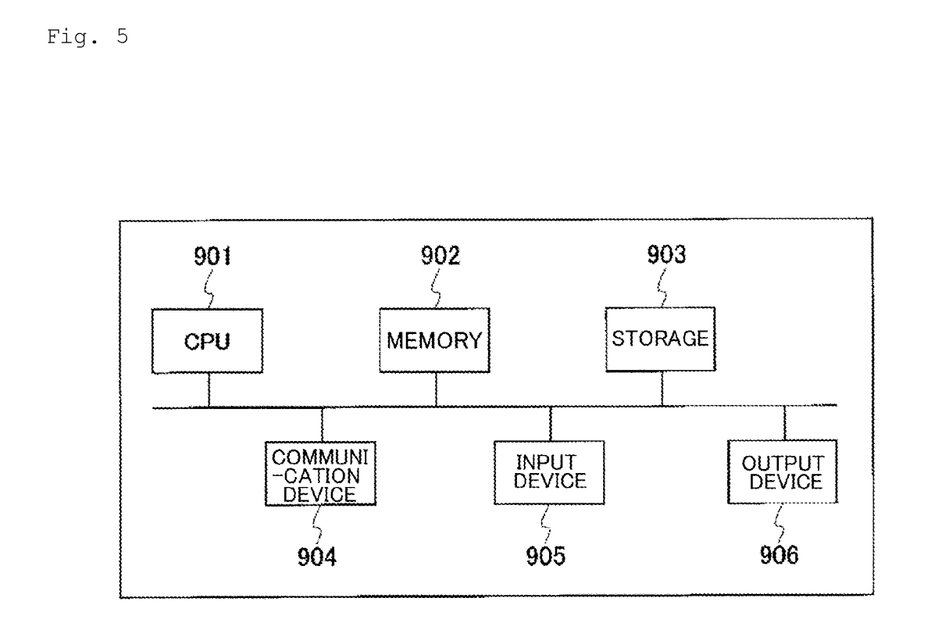
FIG. 5 illustrates an exemplary hardware configuration of the linkage assistance device and the service linkage device.

The above-described linkage assistance device 5 and the service linkage device 1 can use, for example, a general-purpose computer system as shown in FIG. 5. The illustrated computer system includes a CPU (a Central Processing Unit or a processor) 901, a memory 902, a storage 903 (an HDD: Hard Disk Drive or an SSD: Solid State Drive), a communication device 904, an input device 905, and an output device 906. The memory 902 and the storage 903 are storage devices. In this computer system, each function of each of the devices is realized when the CPU 901 executes a prescribed program loaded on the memory 902. For example, the functions of the linkage assistance device 5 and the service linkage device 1 are realized when the CPU of the linkage assistance device 5 executes a program for the linkage assistance device 5 and the CPU of the service linkage device 1 executes a program for the service linkage device 1.

The linkage assistance device 5 and the service linkage device 1 may be implemented by a single computer or by multiple computers. Alternatively, the linkage assistance device 5 and the service linkage device 1 may be a virtual machine implemented in a computer.

The program for the linkage assistance device 5 and the program for the service linkage device 1 may be stored in a computer readable recording medium such as an HDD, an SSD, a USB (Universal Serial Bus) memory, a CD (Compact Disc), and a DVD (Digital Versatile Disc) or distributed over a network.

The present invention is not limited by the above embodiment and modifications thereof, and many variations are possible within the scope and gist of the invention.

REFERENCE SIGNS LIST

1 Service linkage device
10 Catalog interpreting/executing unit
21, 22, 23 Adapter unit
30 Catalog management unit
31, 32, 33 Catalog
41 Linkage catalog
2A, 2B, 2C Service
5 Linkage assistance device
51 Executing unit
52 Storage unit

The invention claimed is:

1. A service linkage assistance device, comprising one or more processors configured to:
   receive, from a service linkage device, a request via a stateless application program interface (API) for a stateful service, wherein the service linkage device executes a linkage service obtained by linking multiple services including the stateful service, wherein the service linkage assistance device is coupled with (i) the stateless API on a northbound side connecting with a higher level device and (ii) one or more stateful APIs on a southbound side connecting with a lower-level device;
   interpret the request and map the request from the stateless API to a corresponding stateful API; and
   execute the stateful API to obtain an execution result of the stateful API;
   store into a storage medium dynamic information including the execution result of the stateful API; and
   notify the service linkage device of the execution result completion of execution of the stateful API and prompt the service linkage device to obtain the execution result of the stateful API.

2. The service linkage assistance device according to claim 1, wherein the one or more processors are configured to include the dynamic information stored in the storage medium in a second or subsequent request to the stateful API.

3. The service linkage assistance device according to claim 1, wherein the dynamic information includes session information between the service linkage assistance device and a server which provides the stateful service.

4. A service linkage assistance method carried out by a service linkage assistance device, the method comprising:
   receiving, from a service linkage device, a request via a stateless application program interface (API) for a stateful service, wherein the service linkage device executes a linkage service obtained by linking multiple services including the stateful service, wherein the service linkage assistance device is coupled with (i) the stateless API on a northbound side connecting with a higher level device and (ii) one or more stateful APIs on a southbound side connecting with a lower-level device;
   interpreting the request and mapping the request from the stateless API to a corresponding stateful API;
   executing the stateful API to obtain an execution result of the stateful API;
   storing into a storage medium dynamic information including the execution result of the stateful API; and
   notifying the service linkage device of the execution result completion of execution of the stateful API and prompting the service linkage device to obtain the execution result of the stateful API.

5. The service linkage assistance method according to claim 4, further comprising: including the dynamic information stored in the storage medium in a second or subsequent request to the stateful API.

6. The service linkage assistance method according to claim 4, wherein the dynamic information includes session information between the service linkage assistance device and a server which provides the stateful service.

7. A non-transitory computer readable medium storing one or more instructions causing a computer to function as a service linkage assistance device to execute:
   receiving, from a service linkage device, a request via a stateless application program interface (API) for a stateful service, wherein the service linkage device executes a linkage service obtained by linking multiple services including the stateful service, wherein the service linkage assistance device is coupled with (i) the stateless API on a northbound side connecting with a higher level device and (ii) one or more stateful APIs on a southbound side connecting with a lower-level device;
   interpreting the request and mapping the request from the stateless API to a corresponding stateful API;
   executing the stateful API to obtain an execution result of the stateful API;
   storing into a storage medium dynamic information including the execution result of the stateful API; and
   notifying the service linkage device of the execution result completion of execution of the stateful API and prompting the service linkage device to obtain the execution result of the stateful API.

8. The non-transitory computer readable medium according to claim 7, further comprising: including the dynamic information stored in the storage medium in a second or subsequent request to the stateful API.

9. The non-transitory computer readable medium according to claim 7, wherein the dynamic information includes session information between the service linkage assistance device and a server which provides the stateful service.

* * * * *